US007740207B2

(12) United States Patent
Ferraz

(10) Patent No.: US 7,740,207 B2
(45) Date of Patent: Jun. 22, 2010

(54) AIRCRAFT FLIGHT CONTROL SYSTEMS AND METHODS

(75) Inventor: Celso Dias Ferraz, São José dos Campos (BR)

(73) Assignee: Embraer - Empresa Brasileira de Aeronautica S.A., Sao Jose dos Campos - SP (BR)

( * ) Notice: Subject to any disclaimer, the term of this patent is extended or adjusted under 35 U.S.C. 154(b) by 128 days.

(21) Appl. No.: 11/843,497

(22) Filed: Aug. 22, 2007

(65) Prior Publication Data

US 2009/0050748 A1 Feb. 26, 2009

(51) Int. Cl.
*B64C 13/04* (2006.01)

(52) U.S. Cl. ....................... 244/234; 244/229; 244/233; 244/232; 244/237; 244/99.4; 384/49; 74/384

(58) Field of Classification Search ................ 244/229, 244/87, 99.4, 99.5, 99.3, 232, 233, 234, 237; 384/49; 74/384
See application file for complete search history.

(56) References Cited

U.S. PATENT DOCUMENTS 1,820,906 A * 9/1931 Bowers ...................... 244/229
2,442,289 A * 5/1948 Garehime ................... 244/222
2,461,194 A * 2/1949 Beetle, Jr. ................. 74/471 R
2,614,438 A * 10/1952 Garmon ....................... 74/504
3,256,749 A * 6/1966 Grohsbach ................... 74/497
3,403,576 A * 10/1968 Ratliff, Jr. ................. 74/471 R
3,726,497 A * 4/1973 Gannett et al. .............. 244/234
3,735,846 A * 5/1973 Hiraiwa ................... 192/53.34
4,529,155 A * 7/1985 Bramwell et al. ........... 244/232
6,343,993 B1 * 2/2002 Duval et al. ................. 464/167
6,474,868 B2 * 11/2002 Geyer et al. ................... 384/49
6,722,616 B2 * 4/2004 Fukada ....................... 244/203
6,761,503 B2 * 7/2004 Breese .................... 403/359.5
6,802,781 B2 * 10/2004 Schwarzler et al. ......... 464/167
6,893,353 B2 * 5/2005 Dutkiewicz et al. ......... 464/167
6,948,401 B2 * 9/2005 Zernickel et al. .............. 74/493
7,066,077 B2 * 6/2006 Schnapp et al. ............... 92/178
2006/0104553 A1 * 5/2006 Faust et al. ................... 384/49

* cited by examiner

*Primary Examiner*—Timothy D Collins
*Assistant Examiner*—Justin Benedik
(74) *Attorney, Agent, or Firm*—Nixon & Vanderhye P.C.

(57) ABSTRACT

An aircraft flight control system advantageously is provided with a control rod which is spline-connected to a bearing assembly so as to permit simultaneous independent longitudinal and rotational movements of the control rod while isolating such movements from one another (e.g., so as to allow operative interconnection to an aircraft's aileron and elevator control surfaces). Thus, the control rod is moveable in longitudinal and rotational directions relative to a longitudinal axis of the control rod in response to pitch and roll command inputs, respectively. The control rod is splined operatively to the bearing assembly so as to allow for independent simultaneous longitudinal and rotational movements of the control rod relative to the longitudinal axis thereof to thereby allow the command inputs to be transferred to the aircraft's respective flight control surfaces.

16 Claims, 6 Drawing Sheets

50'
74-3'
74'
76
74-1'
66
76
70'
76
72-1'
72-3'
66
72'
110
110
60'
110

52
52
Ac
Ae
50
90
95-2
94
95
96-1
95-2
54
95
96-1
112
92
96-2
96
Ad
Af

AIRCRAFT FLIGHT CONTROL SYSTEMS AND METHODS

FIELD OF SUBJECT MATTER

The systems described herein relate generally to aircraft control systems and methods. In especially preferred embodiments, aircraft control systems are described that enable pitch and roll attitudes of an aircraft in flight to be controlled in response to pilot (or autopilot) command inputs.

BACKGROUND OF SUBJECT MATTER

It is well known that an aircraft in flight is commanded through three axes of control, namely the pitch, roll and yaw axes. Control surfaces on the aircraft structure are thus commanded by a pilot (or autopilot if so equipped) to move in appropriate directions so the aircraft attitude may be controllably adjusted relative to such axes of control to thereby allow control over the aircraft's flight path. In conventional aircraft, control of the aircraft about the yaw axis is typically accomplished through foot pedals in the aircraft cockpit which when manipulated by the pilot's feet cause an aircraft rudder to be deflected and thereby yaw the aircraft in the desired direction. Thus, pressing the right rudder pedal will cause the aircraft to yaw rightward while pressing the left rudder pedal will cause the aircraft to yaw leftward.

Movement of the aircraft about the pitch and roll axes is typically accomplished through a control yoke or wheel that is capable of being reciprocally moved forward and aft relative to the aircraft's longitudinal axis as well as being rotated rightward and leftward. Specifically, forward and aftward movement of a control yoke by the pilot will responsively cause an aircraft elevator control surface to be deflected causing downward and upward aircraft pitch changes, respectively. Rotation of the control yoke by the pilot will responsively cause the aircraft's wing-mounted ailerons to be deflected so as to cause rightward and leftward aircraft roll. Therefore, with regard to pitch and roll commands, it is necessary that the movements are separated from each other, even though the pilot command inputs are through a common structural element, the yoke or wheel. Furthermore, since it is necessary for a pilot to provide simultaneous control inputs for all three control axes in order to maintain a coordinated flight attitude, the pitch and roll control system must be capable of pantographic movements.

There are basically two types of control yoke arrangements in conventional aircraft. The first type (e.g., so-called column systems) includes an upright column which is moveable forward and aft so as to control aircraft pitch movement. A yoke is rotatably mounted to the upper end of the column so as to allow for commanded right and left aircraft roll movements in response to turning the yoke right and left, respectively.

A second type of control yoke arrangement (e.g., so-called axial systems) involves a yoke which is installed at an aft end of a yoke shaft which is aligned generally axially with respect to the aircraft. According to one conventional solution, the yoke shaft is composed of a pair or telescopic shafts with the external shaft having a circular cross-section and the internal shaft having a square cross-section. The external shaft is connected rigidly to the yoke at its aft end and includes at its opposite end a sleeve arm installed with bearings to discard rotational movement and instead only allow longitudinal movements to be transmitted to the elevator control system. The internal shaft on the other hand is supported by rollers of the external shaft so as to allow rotational movement of the external shaft to be transmitted to the aileron control quadrants.

While a variety of pitch and roll control systems are already known in the art, some improvements are still desired. For example, it would especially be desirable if an axial control system could be provided such that pitch and roll commands are separated from one another using a single control shaft connected to the yoke. Such an arrangement would thereby reduce the complexity of the control system thereby potentially leading to reduced manufacturing and/or maintenance costs. It is therefore towards fulfilling such needs that the present subject matter is directed.

SUMMARY OF SUBJECT MATTER

Broadly, some preferred embodiments of the subject matter disclosed herein will include a control rod which is spline-connected to a bearing assembly so as to permit simultaneous independent longitudinal and rotational movements of the control rod while isolating such movements from one another (e.g., so as to allow operative interconnection to an aircraft's aileron and elevator control surfaces).

According to some embodiments, an aircraft flight control system is provided which is comprised of a control rod and a rotatable bearing. The control rod is moveable in longitudinal and rotational directions relative to a longitudinal axis of the control rod in response to pitch and roll command inputs, respectively. The rotatable bearing assembly is adapted for connection to aileron control surfaces of the aircraft. The control rod is splined operatively to the bearing assembly so as to allow for independent simultaneous longitudinal and rotational movements of the control rod relative to the longitudinal axis thereof. As such, longitudinal movements of the control rod are isolated from the bearing member but rotational movements of the control rod are transferred to the bearing member to cause rotation thereof and thereby allow operation of the aileron control surfaces.

The bearing assembly according to some embodiments will have an outer fixed position bearing member and a rotatable inner bearing member coaxially positioned with the outer bearing member. The inner bearing member is coupled operatively to the outer bearing member to allow for rotational movements of the inner bearing member relative to the longitudinal axis of the control rod. In such embodiments, the control rod is preferably splined operatively to the inner rotatable bearing member.

Aileron actuators may operatively be connected to the bearing assembly so as to move an aileron control cable and thereby operate the aircraft's aileron control surfaces in response to rotation of the control rod. The aileron actuators may for example be in the form of an aileron quadrant which receives the aileron control cable. Alternatively, the aileron actuators may be in the form of bell cranks and rods that deliver the movement of the control rod to the aileron control cable.

The control rod may be splined operatively to a bearing assembly. Although a single bearing assembly may be employed, it is preferred that an axially spaced apart pair of bearing assemblies be used so as to provide stability and thus avoid elasticity of the entire assembly. The bearing assembly or assemblies may be in the form of any device that serves as a rotational bearing, e.g., bushings of any kind. Preferably, each such bearing assembly may include an outer fixed position bearing member and a rotatable inner bearing member coaxially positioned with the outer bearing member, wherein the control rod is splined operatively to the inner rotatable bearing member, and wherein the outer fixed position bearing members are rigidly interconnected to one another and to an aircraft frame portion. The outer bearing members of the pair of bearing assemblies may be rigidly interconnected to one another by tie rods.

The splined control rod may advantageous include circumferentially spaced apart longitudinal races with the bearing assembly having bearings received within the longitudinal races to permit relative longitudinal movements between the control rod and bearing assembly. Such longitudinal races of the control rod can be symmetrically circumferentially spaced apart relative to one another. The circumferentially spaced-apart races may be in any geometric form suitable for the purpose of permitting longitudinal movements between the control rod and the bearing assembly.

According to some embodiments, the aircraft flight control system may comprise an articulated linkage attached to an end of the control rod operatively such that rotational movements of the control rod are isolated from the articulated linkage, but longitudinal movements of the control rod are transferred to the articulated linkage for operation of an elevator control surface of the aircraft.

Advantageously, an aircraft flight control system may be provided comprising a control rod which is movable rotationally and longitudinally in response to applied roll and pitch command inputs, respectively, an elevator torque tube assembly capable of operative connection to an elevator control surface of the aircraft, and an articulated linkage operatively connecting the control rod to the elevator torque tube assembly. The articulated linkage will preferably comprise a rotational bearing member for receiving a terminal end of a control rod to allow for independent rotational movements therebetween, and a control fork connected at one end to the bearing member and connected at an opposite end to the torque tube assembly to allow for respective articulated movements of the control fork relative to the bearing member and the torque tube assembly about respective articulation axes perpendicular to the control rod. Roll command inputs to the control rod are thereby isolated from the torque tube but pitch command inputs to the control rod are transferred by the articulated linkage to the torque tube to allow operation of the elevator control surface. The torque tube assembly may comprise a torque tube and a bell crank, wherein the control fork is connected to the bell crank at said opposite end thereof about an articulation axis perpendicular to the control rod.

Another advantageous embodiment provides for an aircraft pitch and roll control system comprising a splined control rod which is movable rotationally and longitudinally in response to applied roll and pitch command inputs, respectively, and a bearing assembly operatively spline-connected to the control rod. The bearing assembly may have a fixed position outer bearing member and an inner bearing member capable of connection to an aircraft's aileron control surfaces. The inner bearing member is coupled operatively to the outer bearing member to allow for relative rotational movements about the longitudinal axis of the control rod in response to roll command inputs. The control rod is splined operatively to the inner bearing member so as to allow for independent simultaneous longitudinal and rotational movements of the control rod relative to the longitudinal axis thereof such that longitudinal movements of the control rod are isolated from the inner bearing member but rotational movements of the control rod are transferred to the inner bearing member responsively causing rotation of the inner bearing member relative to the outer bearing member. An elevator torque tube having a bell crank is provided, the elevator torque tube being capable of operative connection to an elevator control surface of the aircraft. An articulated linkage operatively connects the control rod to the bell crank of the elevator torque tube. The articulated linkage comprises a bearing member for receiving a terminal end of a control rod to allow for independent rotational movements therebetween, and a control fork connected at one end to the bearing member and connected at an opposite end to the bell crank to allow for respective articulated movements of the control fork relative to the bearing member and the bell crank about respective articulation axes perpendicular to the control rod. As such, roll command inputs to the control rod are isolated from the torque tube but pitch command inputs to the control rod are transferred by the articulated linkage to the torque tube.

An aircraft may therefore comprise any of the embodiments of the aircraft flight control system disclosed herein.

According to other aspects, a method of providing independent and simultaneous rotational and longitudinal movements of an aircraft control rod in response to roll and pitch command inputs thereto is disclosed. The method comprises establishing an operative spline connection between the control rod and a bearing assembly having a fixed position outer bearing member and a rotational inner bearing member connected operatively to aileron control surfaces of the aircraft which allows for independent simultaneous longitudinal and rotational movements of the control rod relative to the longitudinal axis thereof such that longitudinal movements of the control rod are isolated from the inner bearing member in response to pitch command inputs but rotational movements of the control rod are transferred to the inner bearing member in response to roll command inputs thereby causing rotation of the inner bearing member relative to the outer bearing member. An operative connection is also established between the control rod and an articulated linkage connected to an elevator torque tube assemble associated operatively with an elevator control surface of the aircraft so that roll command inputs to the control rod are isolated from the torque tube assembly but pitch command inputs to the control rod are transferred by the articulated linkage to the torque tube assembly.

According to some embodiments, the method may include providing a spline connection between the control rod and the inner rotatable bearing member by providing longitudinal bearings therebetween. The control rod is advantageously provided with longitudinal races for receiving the longitudinal bearings. In some embodiments, a circumferential race is provided between the inner and outer bearing members and positioning bearings in the circumferential race.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF ILLUSTRATED SUBJECT MATTER

Figure 1:
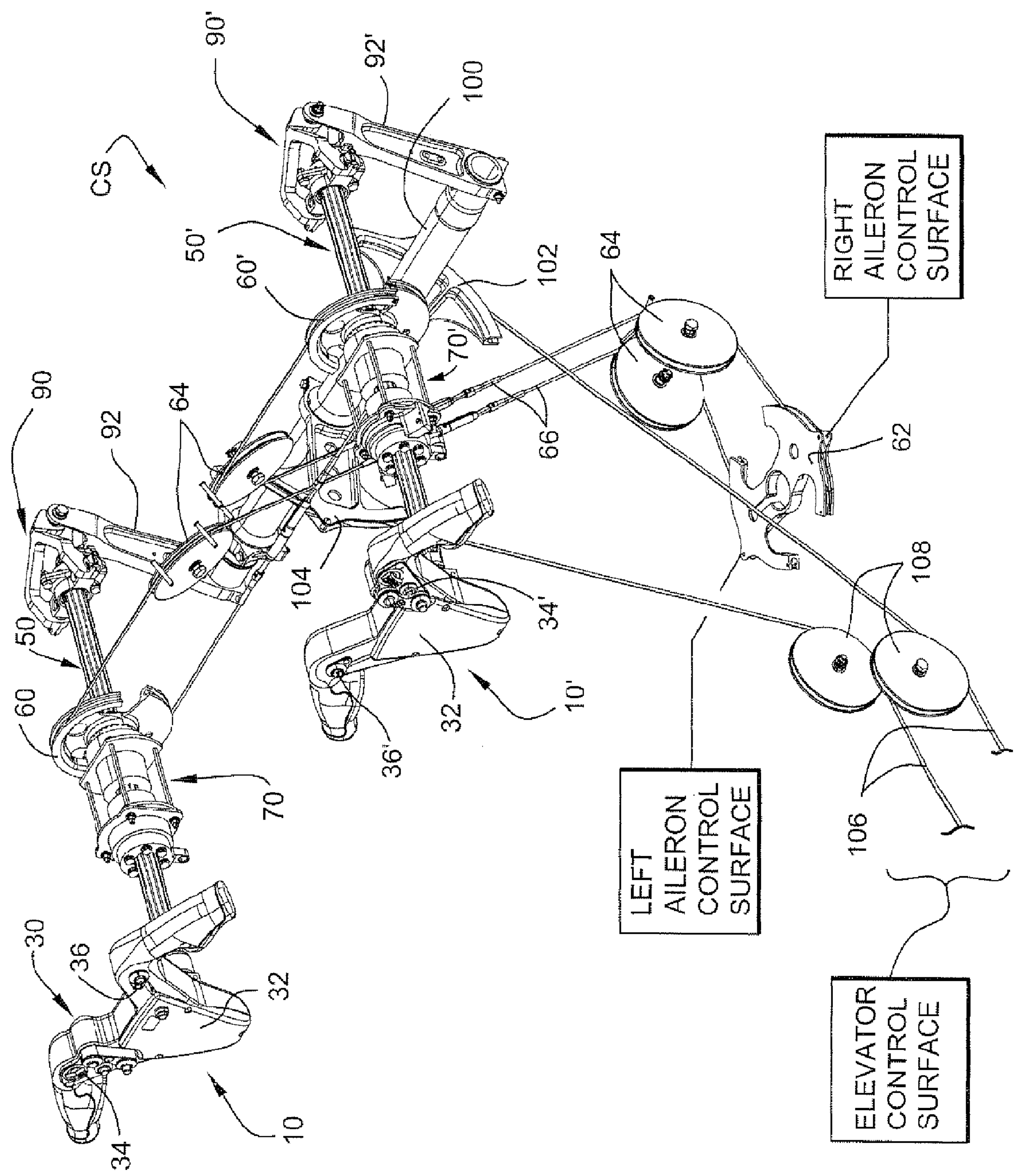
FIG. 1 depicts a front (pilot's) perspective view looking forwardly relative to the aircraft (not shown) of a pitch and roll control system according to a preferred embodiment.
Figure 2:
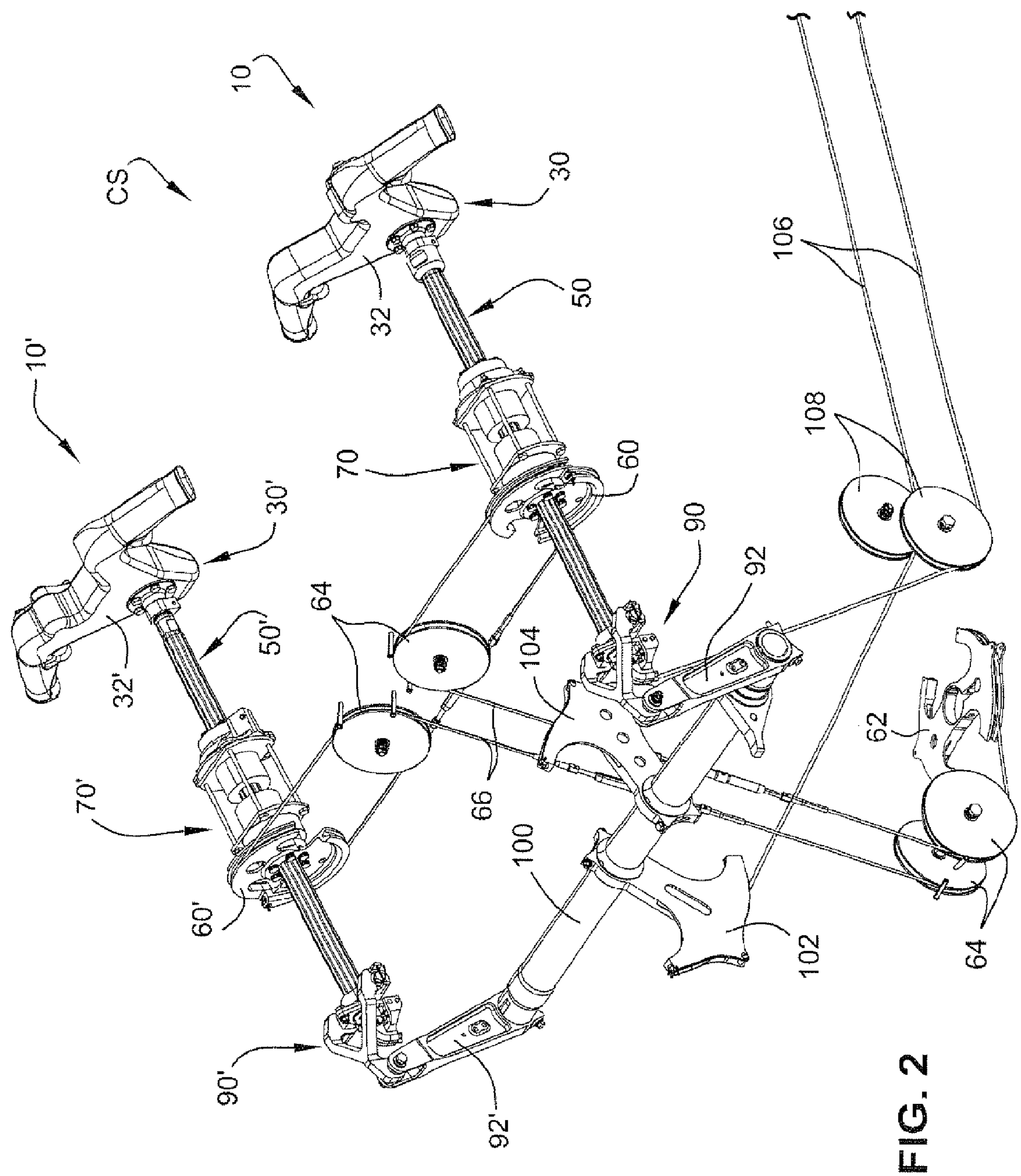
FIG. 2 depicts a rear perspective view of the pitch and roll control system of FIG. 1 but looking in an aft direction of the aircraft (not shown)

Accompanying FIGS. 1 and 2 depict a presently preferred embodiment of a pitch and roll control system CS including pilot and copilot control subsystems 10, 10'. In this regard, for purposes of clarity and brevity, except as may be needed to clarify any structural/functional differences between subsystems 10, 10', only those individual components associated with the pilot control subsystem 10 will be described in detail hereinafter. However, individual components associated with the copilot subsystem 12' are shown in the drawing FIGURES by the same reference numerals as those of the subsystem 12 with a prime (') designation. In addition, the individual components associated with the subsystem 12' will be noted parenthetically in the accompanying textual description immediately adjacent to the components of the pilot control subsystem 12 to which they correspond. It will of course be understood that the pilot and copilot subsystems 12, 12' are slaved to one another so that operation of one will likewise cause the other to operate.

The subsystem 10(10') is generally comprised of a control yoke 30(30'), a one-piece splined control rod 50(50'), a bearing assembly 70(70') and an articulated linkage 90(90'). The control yoke 30(30') may be any conventional wheel structure 32(32') to allow a pilot(copilot) to manipulate the same by exerting rotational and/or axial (push/pull) forces thereon. The control yoke 32(32') depicted in the accompanying FIGS. 1 and 2 is generally that disclosed in commonly owned copending U.S. Design patent application Ser. No. 29/271,590 filed on Jan. 23, 2007. Other forms of control yokes or wheels may of course be envisioned and employed as the particular form of the control yokes or wheels are not critical to the proper functioning of the system described herein. As is conventional, therefore, the control yoke 32, 32') may provide a platform for remote avionics switches 34(34') and a communication (e.g., push-to-talk) switch 36(36'), for example.

The control yoke 32(32') is rigidly coupled to the aft end of the splined shaft 50(50'), while the forward end of the splined shaft 50(50') is coupled operatively to the articulated linkage assembly 90(90'). Between its aft and forward ends, the splined shaft 50(50') is coupled operatively to the bearing assembly 70(70'). As will be described in greater detail below, the bearing assembly 70(70') permits turning movements applied to the yoke 32(32') to be transmitted via the shaft 50(50') to the master aileron quadrant 60(60') fixed to the shaft 50(50'). The aileron quadrant 60(60') is in turn coupled operatively to the slave aileron quadrant 62 by means of pulleys 64 and control cable 66. Thus, slave aileron quadrant 62 is connected to the individual wing-mounted ailerons by suitable control cabling (not shown). Thus, turning movement of the control yoke 32(32') will responsively pivot the slave aileron quadrant 62 which will in turn deflect the ailerons (not shown) to cause the plane to roll right and left (i.e., in response to command inputs sufficient to turn the yoke 32(32') in a right or left direction).

The bearing assembly 70(70') also allows the splined shaft 50(50') to be moved axially therewithin in response to axially directed forces (i.e, push/pull forces) exerted on the yoke 32(32'). Such axially directed forces are in turn transferred by the shaft 50(50') to the articulated linkage 90(90') and thus to the bell crank 92(92') attached at the end of the elevator torque tube 100. The axially directed forces transferred via the articulate linkage 90(90') to the bell crank 92(92') will thus cause the torque tube 100 to rotate about its axis thereby pivoting elevator quadrants 102,104. Pivoting of the elevator quadrants 102, 104 will thus operate the elevator control cable 106 connected to the aircraft's elevator control surface (not shown) via pulleys 108) to change the aircraft pitch and thereby cause the aircraft to descend (i.e., in response to the yoke 32(32') being pushed) or ascend (i.e., in response to the yoke 32(32') being pulled).

Figure 3:
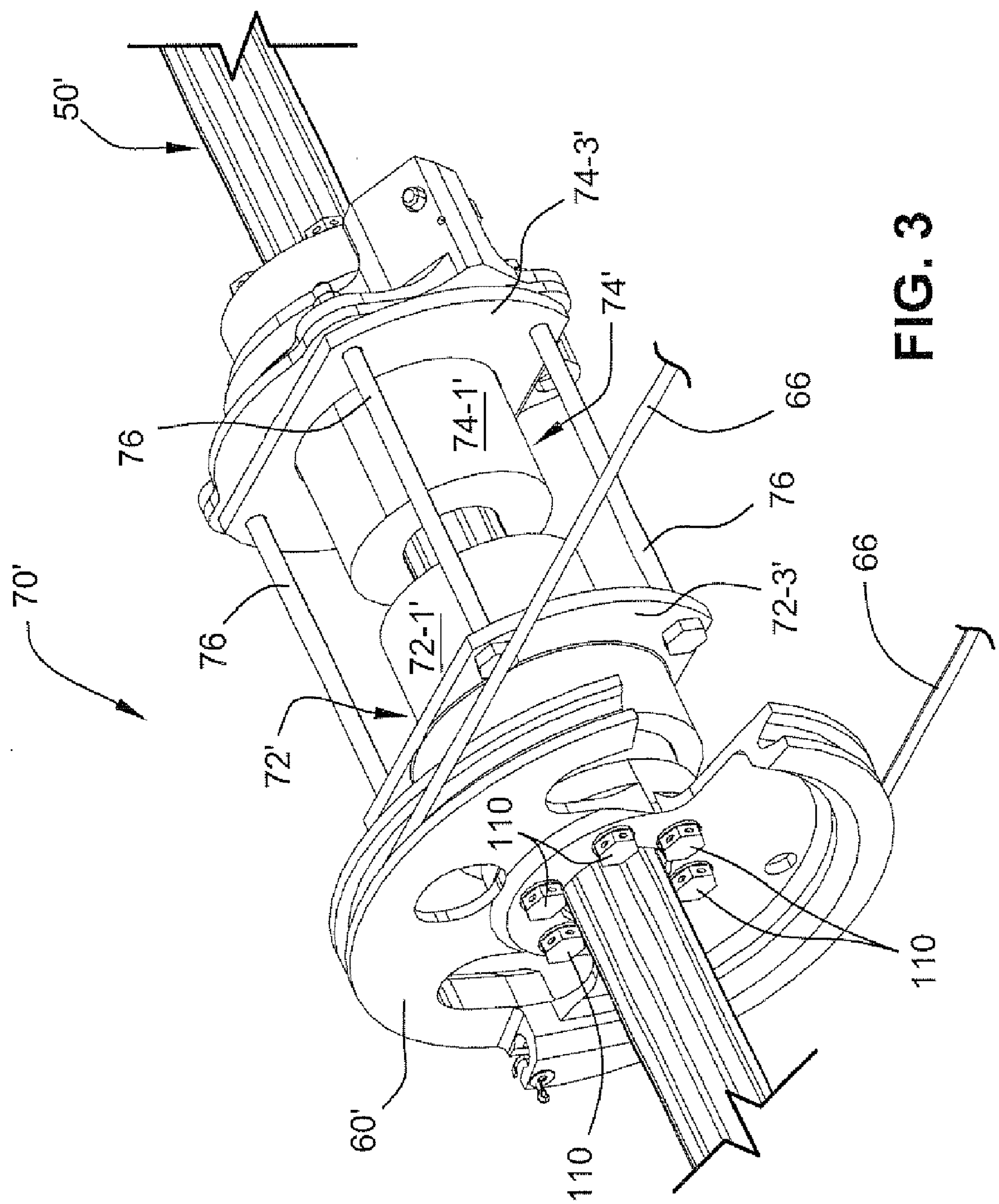
FIG. 3 is a perspective view of a bearing assembly employed in the system of FIGS. 1 and 2.
Figure 4:
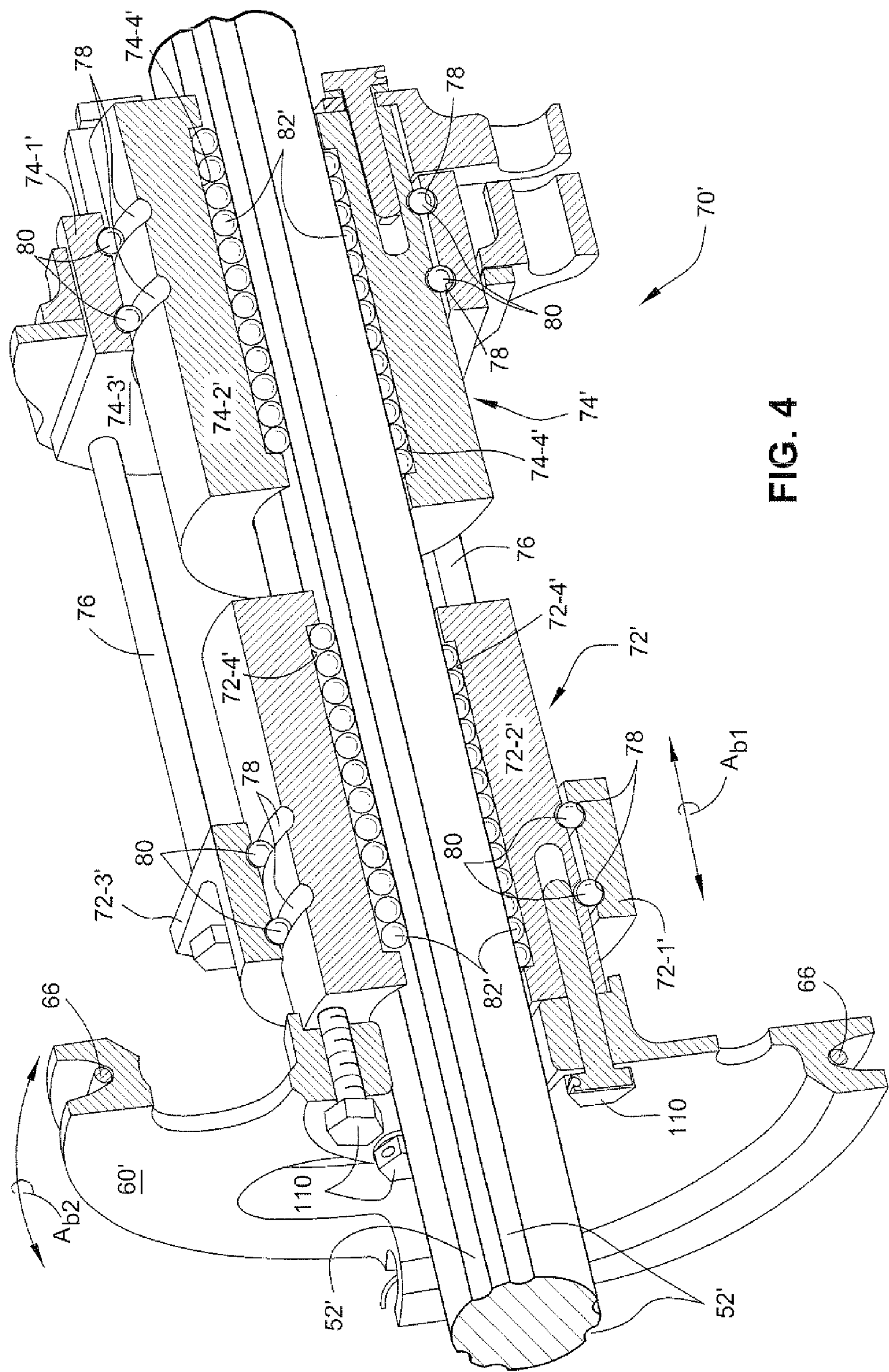
FIG. 4 is an enlarged perspective cross-sectional view of the bearing assembly depicted in FIG. 3.

Accompanying FIGS. 3 and 4 depict in greater detail the bearing assembly 70' that is situated operably on the copilot's side of the control system CS. It will be understood that the bearing assembly 70 situated operably on the pilot's side of the control system CS is structurally identical. As such, the individual component parts of the bearing assembly 70 are the same as the individual component parts of the bearing assembly 70' as shown in FIGS. 3 and 4 and thus will not be separately described.

The bearing assembly 70' includes forward and aft (relative to the aircraft axis) bearing blocks 72', 74' comprised of coaxially positioned outer and inner bearing members 72-1', 72-2' and 74-1', 74-2', respectively. The outer bearing members 72-1', 74-1' include respective mounting flanges 72-3' and 74-3'. The outer bearing members 72-1', 74-1' are coupled together as a unit by means of tie rods 76 being interconnected between the mounting flanges 72-3', 74-3'. The tie rods 76 may also rigidly couple the outer bearing members 72-1', 74-1' a part of the aircraft frame (not shown). Thus, the mounting flanges 72-3', 74'3' and hence the outer bearing members 72-1', 74-1' are in fixed immovable position relative to the aircraft frame and thereby secure the bearing assembly 70' thereto.

The outer bearing assemblies 72-1', 74-1' are coaxially sleeved over the inner bearing assemblies 72-2' and 74-2' and collectively define a pair of circumferential bearing races 78 in which a circumferential ring of bearings 80 is disposed. The aileron quadrant 60' is rigidly fixed to a forward face of the inner bearing member 72-2' perpendicular to the elongate axis of the control rod 50' by means of bolts 110. Thus, rotational motion of the inner bearing members 72-2', 74-2' relative to the outer bearing members 72-1', 74-1' will responsively cause the aileron quadrant 60' to rotate about the axis of the control rod 50' (arrow Aa in FIG. 4) thereby moving the aileron control cable 66 causing deflection of the aircraft's ailerons as has been described previously.

The control rod 50' includes circumferentially spaced-apart parallel races 52' extending lengthwise relative to its longitudinal axis. Most preferably, the races 52' are symmetrically separated from one another about the circumference of the control rod 50' so as to provide a symmetrical bearing load. In this regard, the inner bearing members 72-2', 74-2' carry respective axially aligned spherical bearings 82' received in the races 52' of the control rod 50' and the races 72-4' and 74-4' of the inner bearing members 72-2' and 74-2', respectively. These bearings 82' allow for reciprocal axial movements (arrow Ab1 in FIG. 4) of the control rod 50' relative to the inner bearing members 72-2', 74-2', and hence relative to the aileron quadrant 60', in response to a pushing/pulling force applied to the yoke 52' and thereby operate the aircraft's elevator control surface (not shown, but see FIG. 1). The axial bearings 82' will also transfer rotational motion of the control rod 50' to the inner bearing members 72-2', 74-2' in response to turning movement applied to the yoke 52' so as to cause rotation thereof and hence cause rotation of the aileron quadrant 60' (arrow Ab2 in FIG. 4) to thereby operate the aircrafts aileron control surfaces (not shown, but see FIG. 1). As such, the bearing assembly 70' serves to allow for separate but simultaneous rotational and axial motion of the control rod 50' which in turn allows for separate but simultaneous operation of the aircraft's aileron and elevator control surfaces to enable roll and pitch adjustment of the aircraft in flight.

Figure 5:
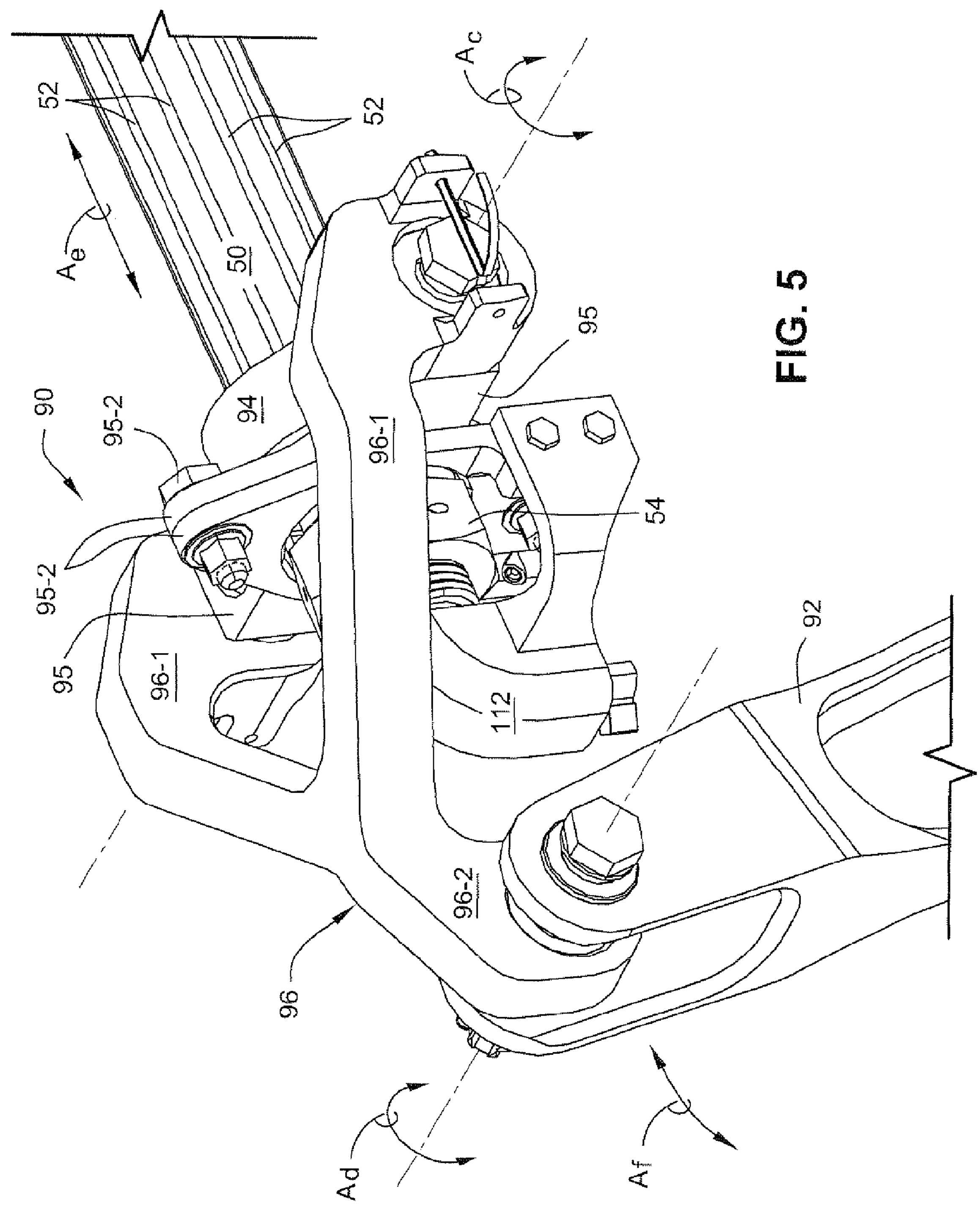
FIG. 5 is a rear perspective view of a pitch control linkage assembly employed in the system of FIGS. 1 and 2.
Figure 6:
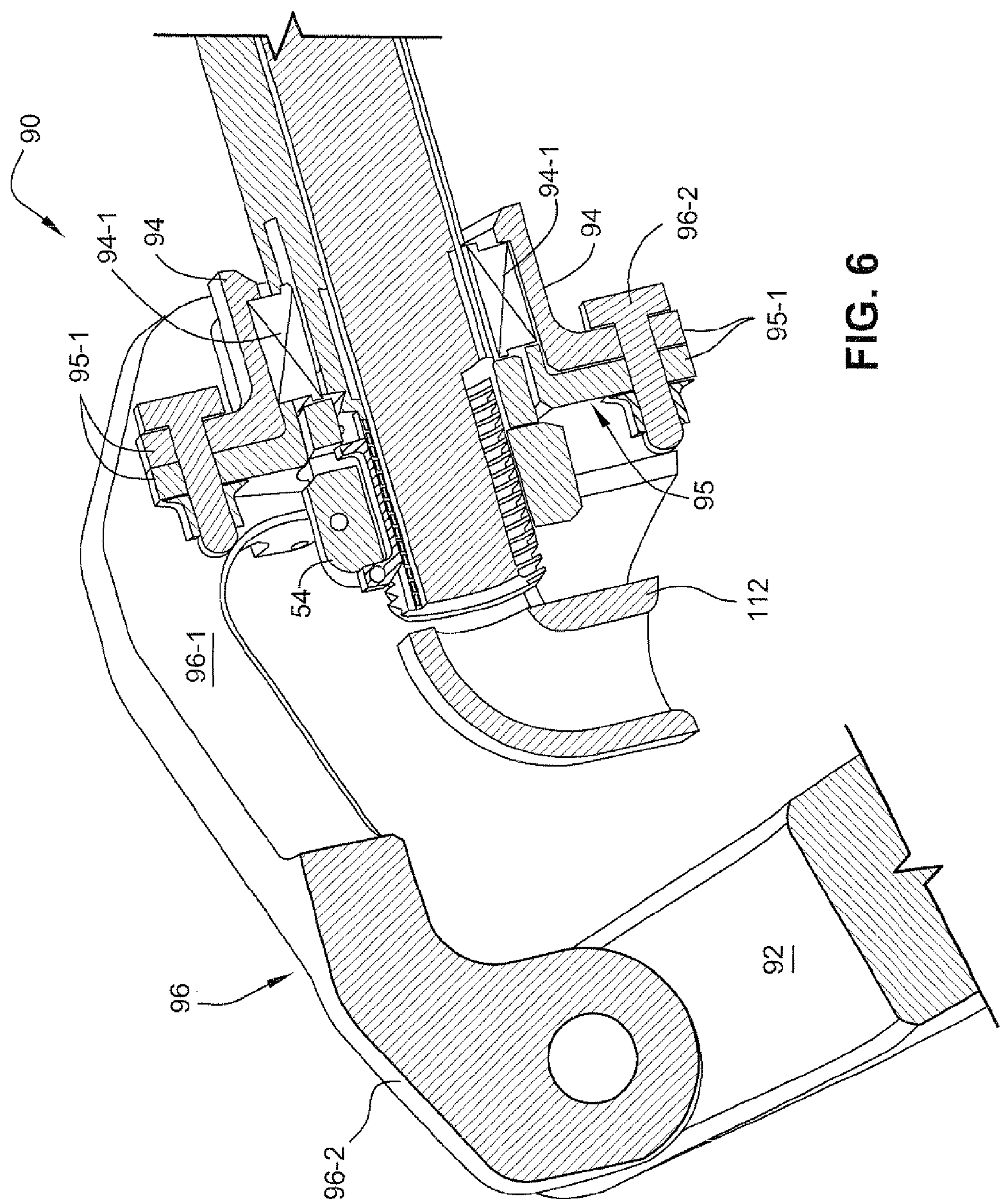
FIG. 6 is a perspective cross-sectional view of the pitch control linkage assembly depicted in FIG. 5.

The articulated linkage 90 that is employed operably on the pilot's side of the control system CS is depicted in greater detail in accompanying FIGS. 5 and 6. It will be understood that the articulated linkage 90' situated operably on the copilot's side of the control system CS is structurally identical. As such, the individual component parts of the articulated linkage 90' are the same as the individual component parts of the articulated linkage 90 as shown in FIGS. 5 and 6 and thus will not be separately described.

As will be observed from FIGS. 5 and 6, the articulated linkage 90 includes a bearing member 94 carrying bearings 94-1 so as to permit rotation of the control rod 50 about its axis. The bearing member 94 is attached to flanges 96-1 of a bearing support block 95 by means of bolts 95-2. A stop nut 54 is threaded onto the terminal end of the control rod 50 so as to cooperate with spacer 56 to join the control rod 50 to the bearing member 94 so as to allow free rotation of the control rod 50 about its longitudinal axis.

A protective nose piece 112 is provided at the terminal end of the control rod 50 and is joined rigidly to the bearing support block 95. The nose piece 112 serves to protect electrical wiring (not shown) associated with yoke-mounted switches 34, 36 and routed through an axial bore within the control rod 50 from torsional stresses as the yoke 32 (and hence the control rod 50) turns rightward and leftward and from bending stresses as the yoke 23 (and hence the control rod 50) moves forward and aft.

A control fork 96 having a pair of fork arms 96-1 joined to a central arm 96-2 is provided so as to provide an articulated coupling between the bearing block 95 and the bell crank 92. More specifically, an axel bolt **96*a* couples the fork arms 96-1 to the bearing block 95 to allow for relative rotation therebetween about the longitudinal axis of the axel bolt 96*a* (arrow Ac in FIG. 5). Similarly, an axel bolt 96*b* couples the central arm 96-2 to an upper end of the bell crank 92 so as to allow for relative rotation therebetween about the longitudinal axis of the axel bolt 96*b* (arrow Ad in FIG. 5). As noted previously, the control rod 50 is capable of independent rotational motion about its longitudinal axis by virtue of its connection via the bearing member 94, and thus such rotational motion is isolated from the structures of the linkage 90. However, longitudinal forces applied to the control rod 50 (e.g., by means of pilot-induced push/pull forces applied to the yoke 52) will cause the control rod 50 to move reciprocally along its longitudinal axis (arrow Ae in FIG. 5). Such longitudinal control rod 50 motion will thus be transferred via the bearing block 95 and control fork 96 to the bell crank 92 so as to impart rotational motion to the elevator torque tube 100** and thereby permit flight pitch adjustments to be made to the aircraft's elevator control surface as described previously.

The control system CS depicted and described herein is intended to be employed in manned (human piloted) aircraft. However, the control system CS could equivalently be employed in unmanned aerial vehicles (UAV's) wherein servo or similar autopilot control is imparted to the control system components so as to allow for remote controlled flight operation.

Therefore, while a presently preferred embodiment has been described in connection with what is presently considered to be the most practical and preferred form thereof, it is to be understood that such a disclosed embodiment is not limiting to the appended claims. As such, the appended claims are intended to cover various modifications and equivalent arrangements included within the spirit and scope of thereof.

What is claimed is:

1. An aircraft flight control system comprising:

a control rod which is moveable in longitudinal and rotational directions relative to a longitudinal axis of the control rod in response to pitch and roll command inputs, respectively, a torque tube assembly for connection to pitch control surfaces of the aircraft; and a rotatable bearing assembly for connection to aileron control surfaces of the aircraft, wherein the bearing assembly has an outer fixed position bearing member and a rotatable inner bearing member coaxially positioned with the outer bearing member, the inner bearing member being coupled operatively to the outer bearing member to allow for rotational movements of the inner bearing member relative to the longitudinal axis of the control rod, and wherein the control rod and the inner bearing assembly collectively define opposed races and include an axially aligned series of spherical bearings positioned within the opposed races to operatively spline-connect the control rod to the inner bearing assembly so as to allow for independent simultaneous longitudinal and rotational movements of the control rod relative to the longitudinal axis thereof such that longitudinal movements of the control rod are isolated from the bearing member but rotational movements of the control rod are transferred to the bearing member to cause rotation thereof and thereby allow operation of the aileron control surfaces, an articulated linkage operatively connecting the control rod to the torque tube assembly so that roll command inputs to the control rod are isolated from the torque tube assembly but pitch command inputs to the control rod are transferred by the articulated linkage to the torque tube assembly, wherein the articulated linkage comprises:

(i) a rotational bearing member for receiving a terminal end of the control rod to allow for independent rotational movements therebetween, and (ii) a control fork connected at one end to the bearing member and connected at an opposite end to the torque tube assembly to allow for respective articulated movements of the control fork relative to the bearing member and the torque tube assembly about respective articulation axes perpendicular to the control rod.

2. The aircraft flight control system of claim 1, wherein the bearing assembly includes an aileron quadrant for receiving an aileron control cable, the aileron quadrant being fixed to and rotatable with the inner bearing member.

3. The aircraft flight control system of claim 1, comprising an axially spaced apart pair of said bearing assemblies to which the control rod is operatively spline-connected.

4. The aircraft flight control system of claim 3, wherein each of bearing assemblies includes an outer fixed position bearing member and a rotatable inner bearing member coaxially positioned with the outer bearing member, wherein the control rod is operatively spline-connected to the inner rotatable bearing member, and wherein the outer fixed position bearing members are rigidly interconnected to one another and to an aircraft frame portion.

5. The aircraft flight control system of claim 4, wherein the outer bearing members of the pair of bearing assemblies are rigidly interconnected to one another by tie rods.

6. The aircraft flight control system of claim 1, wherein the control rod includes circumferentially spaced apart longitudinal races, and wherein the bearings are received within the longitudinal races to permit relative longitudinal movements between the control rod and bearing assembly.

7. The aircraft flight control system of claim 6, wherein the longitudinal races of the control rod are symmetrically circumferentially spaced apart relative to one another.

8. An aircraft flight control system comprising:

a control rod;

a bearing assembly for connection to aileron control surfaces of the aircraft, the bearing assembly mounting the control rod to allow for rotational and longitudinal movements thereof in response to applied roll and pitch command inputs, respectively, wherein the bearing assembly has an outer fixed position bearing member and a rotatable inner bearing member coaxially positioned with the outer bearing member, the inner bearing member being coupled operatively to the outer bearing member to allow for rotational movements of the inner bearing member relative to the longitudinal axis of the control rod, and wherein the control rod and the inner bearing assembly collectively define opposed races and include an axially aligned series of spherical bearings positioned within the opposed races to operatively spline-connect the control rod to the inner bearing assembly so as to allow for independent simultaneous longitudinal and rotational movements of the control rod relative to the longitudinal axis thereof such that longitudinal movements of the control rod are isolated from the bearing member but rotational movements of the control rod are transferred to the bearing member to cause rotation thereof and thereby allow operation of the aileron control surfaces, the system further comprising, an elevator torque tube assembly capable of operative connection to an elevator control surface of the aircraft, and an articulated linkage operatively connecting the control rod to the elevator torque tube assembly so that roll command inputs to the control rod are isolated from the torque tube but pitch command inputs to the control rod are transferred by the articulated linkage to the torque tube to allow operation of the elevator control surface, wherein the articulated linkage comprises:

(i) a rotational bearing member for receiving a terminal end of the control rod to allow for independent rotational movements therebetween, and (ii) a control fork connected at one end to the bearing member and connected at an opposite end to the torque tube assembly to allow for respective articulated movements of the control fork relative to the bearing member and the torque tube assembly about respective articulation axes perpendicular to the control rod.

9. The aircraft flight control system of claim 8, wherein the torque tube assembly comprises a torque tube and a bell crank, wherein the control fork is connected to the bell crank at said opposite end thereof about an articulation axis perpendicular to the control rod.

10. The aircraft flight control system of claim 8, wherein control rod includes circumferentially spaced apart longitudinal races, and wherein the bearings are received within the longitudinal races to permit relative longitudinal movements between the control rod and bearing assembly.

11. The aircraft flight control system of claim 10, wherein the longitudinal races of the control rod are symmetrically circumferentially spaced apart relative to one another.

12. An aircraft pitch and roll control system comprising:

a control rod which is movable rotationally and longitudinally in response to applied roll and pitch command inputs, respectively, the control rod having a plurality of circumferentially spaced apart longitudinal races, a bearing assembly having a fixed position outer bearing member and an inner bearing member capable of connection to an aircraft's aileron control surfaces, wherein the inner bearing member is coupled operatively to the outer bearing member to allow for relative rotational movements about the longitudinal axis of the control rod in response to roll command inputs, and wherein the inner bearing member defines inner races that are opposed to the longitudinal races of the control rod, wherein the inner and longitudinal races of the control rod and the inner bearing assembly, respectively, include axially aligned series of spherical bearings positioned therewithin to operatively spline-connect the control rod to the inner bearing assembly so as to allow for independent simultaneous longitudinal and rotational movements of the control rod relative to the longitudinal axis thereof such that longitudinal movements of the control rod are isolated from the inner bearing member but rotational movements of the control rod are transferred to the inner bearing member responsively causing rotation of the inner bearing member relative to the outer bearing member, an elevator torque tube having a bell crank, the elevator torque tube being capable of operative connection to an elevator control surface of the aircraft, and an articulated linkage operatively connecting the control rod to the bell crank of the elevator torque tube, wherein the articulated linkage comprises:

a bearing member for receiving a terminal end of a control rod to allow for independent rotational movements therebetween, and a control fork connected at one end to the bearing member and connected at an opposite end to the bell crank to allow for respective articulated movements of the control fork relative to the bearing member and the bell crank about respective articulation axes perpendicular to the control rod, wherein roll command inputs to the control rod are isolated from the torque tube but pitch command inputs to the control rod are transferred by the articulated linkage to the torque tube.

13. An aircraft which comprises an aircraft flight control system according to claims 1, 8 or 12.

14. A method of providing independent and simultaneous rotational and longitudinal movements of an aircraft control rod in response to roll and pitch command inputs thereto, the method comprising:

(a) establishing an operative spline connection between the control rod and a bearing assembly having a fixed position outer bearing member and a rotational inner bearing member connected operatively to aileron control surfaces of the aircraft which allows for independent simultaneous longitudinal and rotational movements of the control rod relative to the longitudinal axis thereof such that longitudinal movements of the control rod are isolated from the inner bearing member in response to pitch command inputs but rotational movements of the control rod are transferred to the inner bearing member in response to roll command inputs thereby causing rotation of the inner bearing member relative to the outer bearing member; and (b) establishing an operative connection between the control rod and an articulated linkage connected to an elevator torque tube assembly associated operatively with an elevator control surface of the aircraft so that roll command inputs to the control rod are isolated from the torque tube assembly but pitch command inputs to the control rod are transferred by the articulated linkage to the torque tube assembly, wherein step (a) comprises (ai) providing the control rod and the inner bearing assembly collectively defined opposed races, and (aii) positioning within the opposed races an axially aligned series of spherical bearings, and wherein step (b) comprises (bi) providing a rotational bearing member for receiving a terminal end of the control rod to allow for independent rotational movements therebetween, and (ii) connecting a control fork at one end thereof to the bearing member and connecting the control fork at an opposite end thereof to the torque tube assembly to allow for respective articulated movements of the control fork relative to the bearing member and the torque tube assembly about respective articulation axes perpendicular to the control rod.

15. The method of claim 14, comprising providing the control rod with circumferentially spaced-apart longitudinal races for receiving the axial aligned series of spherical bearings therewithin.

16. The method of claim 14, comprising providing a circumferential race between the inner and outer bearing members and positioning bearings in the circumferential race.

* * * * *